United States Patent [19]

Nenov

[11] 4,384,725
[45] May 24, 1983

[54] LIQUID LUBRICANT SEAL WITH OLEOPHOBIC COATING

[75] Inventor: Neno T. Nenov, Williamsville, N.Y.

[73] Assignee: Union Carbide Corporation, Danbury, Conn.

[21] Appl. No.: 381,845

[22] Filed: May 24, 1982

[51] Int. Cl.³ .............................................. F16J 15/16
[52] U.S. Cl. ........................................ 277/3; 277/32; 277/53; 277/208; 277/233
[58] Field of Search ................... 277/1, 3, 12, 32, 227, 277/53, 138, 233, 165, 207 R, 208, 237; 308/78, 168, 237 R, 237 A, 238, 240, 241

[56] References Cited

U.S. PATENT DOCUMENTS

| | | | |
|---|---|---|---|
| 2,326,824 | 8/1943 | Browne et al. | 230/132 |
| 2,704,234 | 3/1955 | Love et al. | 308/237 |
| 2,932,535 | 4/1960 | Peickii et al. | 277/32 X |
| 3,001,837 | 9/1961 | Lamson et al. | 308/188 |
| 3,013,823 | 12/1961 | Schulz | 277/87 X |
| 3,155,441 | 11/1964 | Bemmann | 308/241 |
| 3,360,239 | 12/1967 | Swearingen | 253/39 |
| 3,375,015 | 3/1968 | Swearingen | 277/3 |
| 3,388,913 | 6/1968 | Tracy | 277/32 |
| 3,420,434 | 1/1969 | Swearingen | 230/116 |
| 3,545,770 | 12/1970 | Wheelock | 277/237 |
| 3,831,381 | 8/1974 | Swearingen | 60/657 |
| 4,005,580 | 2/1977 | Swearingen | 60/657 |
| 4,095,857 | 6/1978 | Palmer | 308/168 |
| 4,193,603 | 3/1980 | Sood | 277/3 |

FOREIGN PATENT DOCUMENTS 2065797 7/1981 United Kingdom ............... 277/227

Primary Examiner—Robert S. Ward, Jr.
Attorney, Agent, or Firm—Stanley Ktorides

[57] ABSTRACT

A clearance-type seal for use in rotary fluid handling machinery for preventing lubricant from leaking into working fluid by flowing by capillary action along a fixed surface wherein a coating which is not wetted by the lubricant is placed on the fixed surface of the machinery such that any lubricant which may flow onto the coating is caused to bead up and is thus easily swept away by flow of seal gas.

4 Claims, 4 Drawing Figures

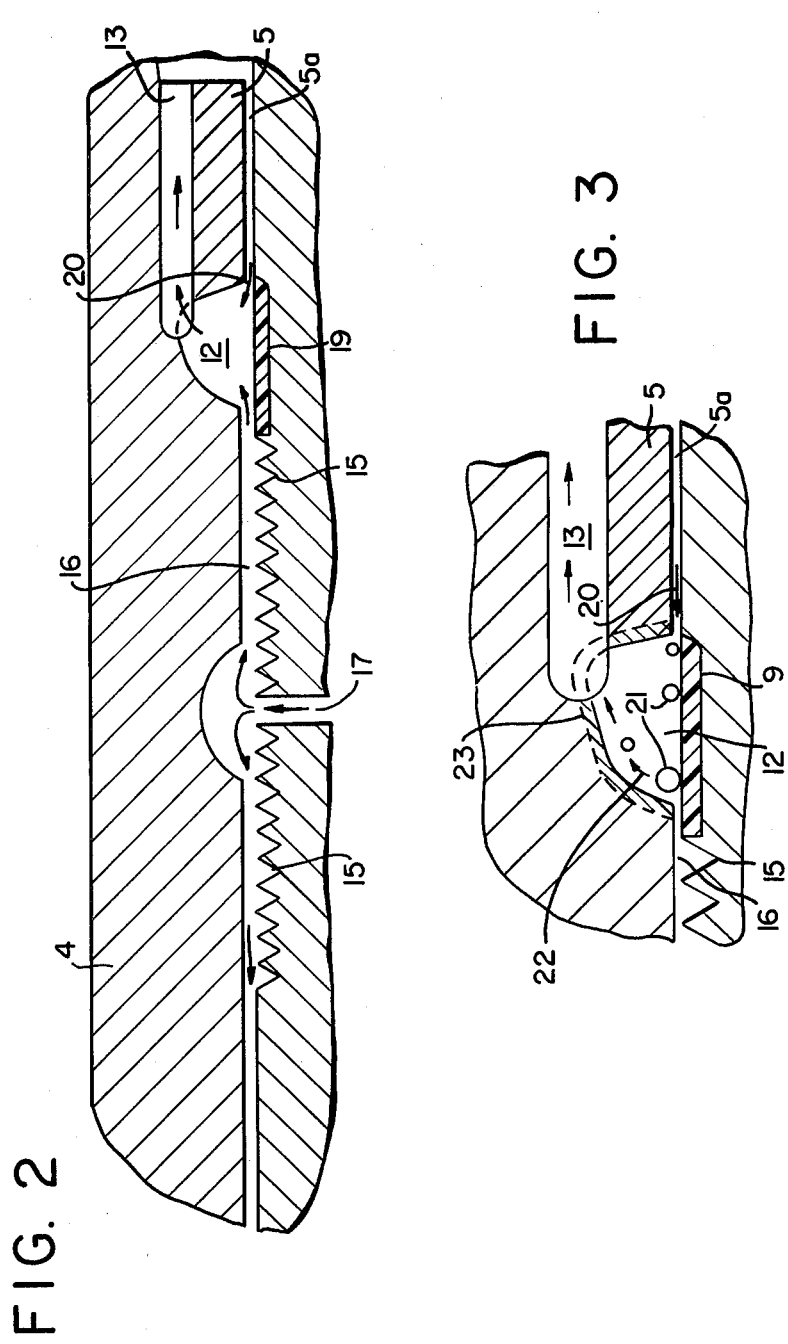

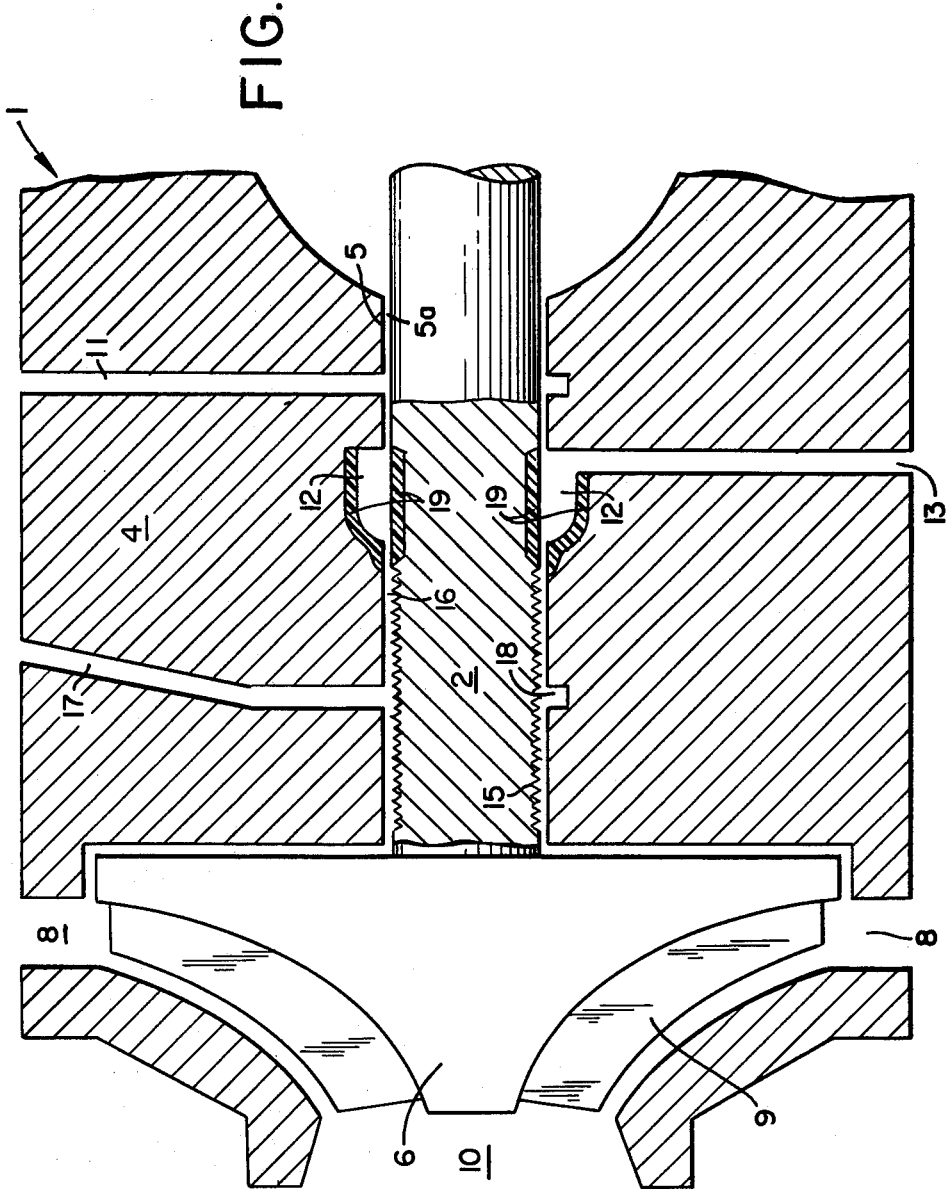

LIQUID LUBRICANT SEAL WITH OLEOPHOBIC COATING

TECHNICAL FIELD

This invention relates generally to the field of sealing apparatus for preventing lubricant leakage into the working chambers of rotary fluid handling devices and more particularly to clearance-type sealing apparatus.

BACKGROUND ART

Rotary fluid handling machines, such as turbines, employ a rotor to recover energy from a working fluid and transfer the energy from a working chamber to a use point. The rotor is comprised of a rotatable member which rotates relative to a fixed member. The rotor may be either a rotatable shaft for rotation within a fixed support or housing which extends axially along and circumferentially around the shaft or it may be a rotatable element extending axially along and circumferentially around a fixed shaft for rotation around the fixed shaft. Generally bearings are used to keep the rotor in alignment. Such bearings are generally lubricated by a liquid lubricant which is generally petroleum based.

It is important that such lubricant be prevented from entering the working chamber of the fluid handling machine and mix with the working fluid as this would reduce the efficiency of the energy transfer from the working fluid and would also result in loss of lubricant.

In order to prevent lubricant from entering the rotary machine working chamber a sealing device may be interposed between the lubricated bearing and the working chamber. One type of sealing device is a contact-type seal wherein the seal apparatus fits between and is in contact with both rotating and fixed elements. However, contact-type seals, also known as rubbing or sliding type seals, generally cannnot be employed in high speed rotary machines, which operate at speeds at or above 1000 rpm, because such seals would wear rapidly and/or fuse with the rotating element due to the high temperatures generated by the rubbing surfaces. In such high speed rotary machines clearance-type seals which do not require contact with a moving surface are more generally used.

A clearance-type seal comprises a narrow spacing between the rotatable and fixed members along at least a portion of their axial length. This narrow spacing is between the lubricated bearing and the working chamber along an axial direction. A gas is introduced to the narrow spacing and flows toward the lubricated bearing. Lubricant from the bearing which flows along on both the rotating and fixed surfaces is prevented from entering into the narrow spacing by the flow of this sealing gas flowing therefrom. The seal may be made more effective by a series of grooves in the shaft surface which serve to minimize gas leakage by the imposition of a flow restriction. Such a seal employing the series of grooves is generally termed a labyrinth seal.

Lubricant from the bearing flows on both the rotating and fixed surfaces toward the sealing gas flow. Lubricant on the rotating surface is hindered from entering the narrow spacing between the shaft and the housing due to the inertial forces which arise, and such lubricant, with the help of the sealing gas flow, is guided into a lubricant collection device, which is generally a recess in the housing, and from there may be collected for reuse. However, lubricant flowing on the non-rotating or fixed surface is not hindered by inertial forces from flowing toward the narrow spacing and a small amount may enter the narrow spacing in spite of the sealing gas flow. This movement by capillary action of the liquid lubricant along the non-rotating surface may result in some lubricant passing into the working chamber of the fluid handling machine.

While the leakage of a small amount of lubricant into the working chamber may not pose significant difficulties in some applications, when the fluid handling machine is employed in a cryogenic operation, especially in cryogenic air separation, such lubricant leakage may create severe problems. For example, such lubricant may solidify at the cold temperatures employed resulting in reduced heat transfer and possibly even blocked flow passages. Furthermore, occasional plant thawing might extend the lubricant throughout the cryogenic plant and may result in a lubricant deposit in an area where fire or explosion hazard is substantial. It is therefore desirable to provide a clearance-type seal for use with high speed rotary fluid handling machines in a cryogenic plant which stops virtually all lubricant from entering the working chamber.

It is therefore an object of this invention to provide an improved clearance-type seal.

It is another object of this invention to provide an improved clearance-type seal which effectively stops lubricant on the non-rotating surface of a rotary fluid handling machine from flowing by capillary action along the non-rotating surface past the seal.

SUMMARY OF THE DISCLOSURE

The above and other objects which will become apparent to one skilled in this art are achieved by:

A clearance-type liquid lubricant seal assembly comprising:
(a) a shaft member;
(b) a wall member extending axially along and circumferentially around said shaft member, one of said members being fixed and the other member being rotatable relative to said fixed member, said members being closely spaced for at least a portion of their axial length.
(c) lubricant collection means comprising a recess in said wall member in flow communication with said closely spaced portion positioned between said closely spaced portion and a source of lubricant;
(d) means for supplying sealing gas to said closely spaced portion such that a sealing gas flow stream is caused to flow from said closely spaced portion toward said source of lubricant; and
(e) an oleophobic coating on said fixed member in the vicinity of said lubricant collection means, whereby liquid lubricant entering the vicinity of said lubricant collection means and flowing on said fixed member is caused to form beads which are entrained in said sealing gas flow stream and thus substantially prevented from entering said closely spaced portion.

The term, "lubricant", is used in the present application and claims to mean a fluid which is liquid under operating conditions and which is employed to reduce friction between surfaces. The lubricant is generally a petroleum derivative but need not be and may be any effective friction reducing liquid.

The term, "oleophobic", is used in the present application and claims to describe a material which is substantially non-wetted by the lubricant and which will cause lubricant positioned upon it to bead up by the operation of and under the influence of surface tension forces. The term, "oleophobic coating", is not limited to a coating which is non-wetted by a petroleum based fluid but encompasses any coating which is non-wetted by any lubricant.

The term, "capillary action or capillary movement", is used in the present application and claims to mean liquid flow or spreading induced by the forces of adhesion between liquid and solid interfaces.

BRIEF DESCRIPTION OF THE DRAWINGS

FIG. 2 is a more detailed representation of the FIG. 1 embodiment, showing in greater detail the oleophobic coating on the shaft and the flows of lubricant and sealing gas.

FIG. 3 is a more detailed representation of the FIG. 2 representation, showing in greater detail the lubricant being caused to bead as it flows over the oleophobic coating and also the subsequent entrainment of the lubricant beads in the sealing gas flow.

FIG. 4 is a representation of another embodiment of the seal assembly of this invention wherein the shaft member is rotatable and wherein the oleophobic coating is on both the fixed member and the rotating member.

DETAILED DESCRIPTION

Figure 1:
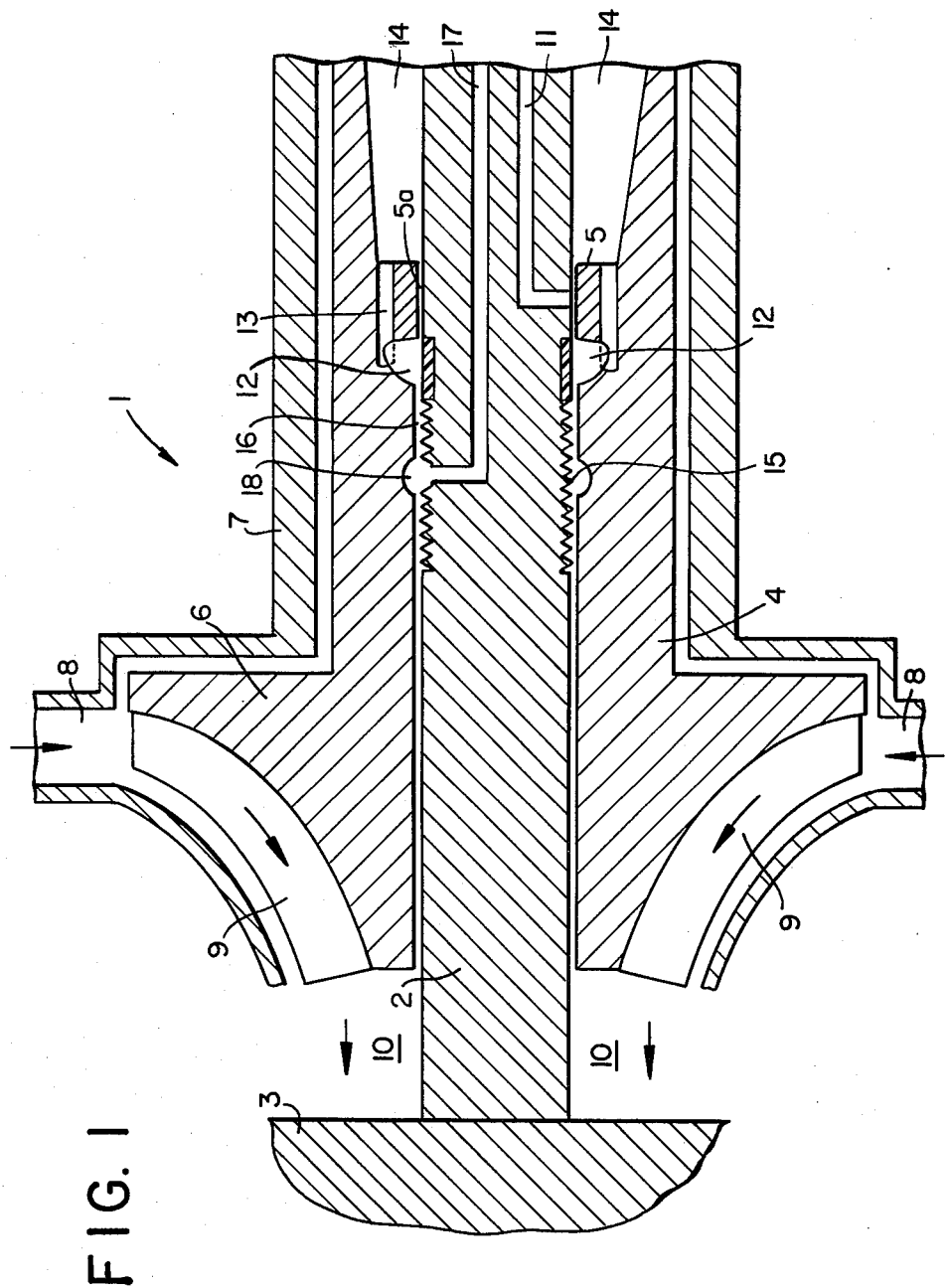
FIG. 1 is a representation of one embodiment of the seal assembly of this invention wherein the shaft member is fixed and the wall member is rotatable.

This invention is a clearance-type seal for use in rotary fluid handling devices which employ a rotor which is rotatable relative to a fixed element. The rotatable element may be caused to rotate by energy transfer from a working fluid. A typical example of such energy transfer is the expansion of a gas. The rotatable element may be connected to some type of power consuming device such as a compressor or an electric generator and as the rotatable element rotates it drives the power consuming device and causes work to be done.

The clearance-type seal of this invention will be described in greater detail with reference to the drawings.

FIG. 1 is a representation of a fluid handling device which is driven by expanding gases and in which the shaft is fixed and the rotor rotates relative to the fixed shaft. The fluid handling device 1 includes a non-rotating shaft 2 connected to and supported by a support 3. A rotor 4 is supported for rotation on shaft 2 within housing 7 by spaced lubricated bearing 5. In this representation one bearing is shown although those skilled in the art will recognize that one or more additional bearings such as a journal bearing or a thrust bearing are generally also employed in such rotary fluid handling machinery.

The working fluid is introduced into wheel 6 of rotor 4 through inlet annulus 8. Wheel 6 may also be provided with annular seals to prevent working fluid leakage between the wheel and housing 7. The working fluid passes through wheel blades 9 and exits in an axial direction at 10. As the working fluid passes through wheel 6, energy is transferred to the rotor 4 which is caused to rotate and which may drive some type of power-consuming device such as a compressor or an electric generator.

Bearing 5 constitutes a close radial clearance 5a between shaft 2 and rotor 4 to which a liquid lubricant is introduced through passageway 11. The lubricant flows circumferentially and axially along the shaft in both directions from the passageway 11. Lubricant flowing in the direction of wheel 6 exits into collection recess 12. As the lubricant enters recess 12 the centrifugal force created by the high rotational speed of rotor 4 causes the lubricant to flow to the outermost wall of recess 12. From there the lubricant passes through vent passageways 13 and into annular chamber 14 from which it is drained.

To prevent lubricant from flowing into the exit end of wheel 6 a clearance-type seal 15 is positioned between bearing 5 and wheel 6. In the embodiment illustrated in FIG. 1, a labyrinth seal is shown. The labyrinth seal is formed by a series of grooves into the shaft to create a restricted flow path along the interface of the shaft and rotor.

Seal gas is injected into the seal at a point between the ends of the seal through passageway 17 which is connected to chamber 18. The seal is gas is injected at a sufficient pressure so that it will flow from chamber 18 axially towards each end of seal 15 through restricted flow path 16. The seal gas flow prevents leakage of lubricant into the working fluid.

The seal gas may be any gas which is inert to the lubricant, does not cause an explosion hazard and will not corrode or otherwise harm the machinery. Examples of seal gas include air, nitrogen, oxygen and argon. The seal gas may also be the working fluid. In such a case the seal gas flow may be leakage between the shaft and rotor from the wheel exit; in this case passageway 17 and chamber 18 need not be used.

To prevent the flow by capillary action of lubricant against the seal gas flow along the stationary member, in this case the shaft, a surface coating 19 of an oleophobic material is placed on the stationary or fixed member in the vicinity of recess 12. The oleophobic coating is present in any effective thickness sufficient to cause lubricant to bead up when it flows on it. An effective thickness may be, for example, two mils.

The oleophobic coating may be any effective material chemically inert to the lubricant and seal gas used and, depending upon the lubricant employed, the oleophobic coating may be, for example, fluorocarbon resins such as tetrafluoroethylene, fluorinated ethylpropylene, polytetrafluoroethylene, other halogenated polymers such as polychlorotrifluoroethylene, poly(vinyl fluoride), poly(vinylidene fluoride), polytrifluoroethylene, polyhexafluoropropylene, tetrafluoroethylene—hexafluoropropylene copolymer and other materials such as silicone films, absorbed phosphate esters, barium stearate and Silverstone TM. Indeed, any material which is substantially non-wetted by the lubricant used and is chemically inert to both the lubricant and the seal gas used can be used as the oleophobic coating.

The clearance-type seal assembly of this invention employing the oleophobic coating is further illustrated in FIGS. 2 and 3 which are respectively progressively more detailed views of the embodiment of FIG. 1. The numbering in FIGS. 2 and 3 is identical to that of FIG. 1 for the common elements.

Referring now to FIGS. 2 and 3, lubricant flowing from bearing 5 in the direction of arrow 20 enters lubricant collection recess 12. As the lubricant flows onto the oleophobic coating 19 on the portion of the shaft facing the recess 12, surface tension forces cause the lubricant to form small beads or drops 21. Any of these beads or drops which migrate towards the restricted flow path 16 are easily entrained into the seal gas flow indicated by arrows 22.

As opposed to the thin lubricant film which would tend to form along the surface of the fixed shaft in the absence of the oleophobic coating, the beads or drops impose a relatively sizable drag on the flow of seal gas into the lubricant collection recess 12. The frictional interaction between the seal gas flow and the lubricant drops or beads, also known in the art as Stokes drag, insures their entrainment with the seal gas.

The use of the seal assembly of this invention reduces the necessity of sonic seal gas flow as it leaves seal 15.

Once the lubricant is deposited on the surface of the recess 12 which is in rotor 4, the high centrifugal force created by the rotation of rotor 4 causes the lubricant to flow through passageways 13 to where it can be collected for reuse. In order to further aid the removal of lubricant from recess 12, the rotor surface of recess 12 may also be coated with the oleophobic material. This optional coating of the lubricant collection recess rotating surface is illustrated in FIG. 3 by the dashed line 23.

FIG. 4 illustrates another embodiment of the seal assembly of this invention wherein the rotary fluid handling machinery employs a rotating shaft within a fixed housing. The numbering on FIG. 4 corresponds to that of FIG. 1 for the elements of the FIG. 4 embodiment which correspond to those of the FIG. 1 embodiment.

Referring now to FIG. 4, rotary fluid handling device, or turbine 1, includes rotatable shaft 2 which is integrally connected to wheel 6, both of which are supported for rotation within fixed member 4 by liquid lubricated bearing 5. A working fluid flows radially inward through inlet annulus 8 to wheel blades 9 attached to wheel 6 which is caused to rotate thus turning shaft 2. The working fluid then exits the turbine in axial direction 10.

Lubricant for bearing 5 is introduced through passageway 11 and flows circumferentially and axially along shaft 2 in both directions from passageway 11 thus maintaining shaft 2 in a spaced relationship with member 4. Lubricant flowing towards wheel 6 from bearing 5 passes into lubricant collection recess 12. The centrifugal force created by the high rotational speed of shaft 2 causes lubricant which may be on shaft 2 to be thrown off shaft 2 and into collection recess 12 from which it is drained through passageway 13.

A labyrinth seal 15 is positioned between bearing 5 and wheel 6. Seal gas is injected to the seal between the ends through passageway 17. The seal gas flows from chamber 18 toward each end of the seal through the restricted flow path 16 thus preventing lubricant from travelling past the seal and mixing with the working fluid.

An oleophobic coating 19 is placed on the section of fixed member 4 surrounding shaft 2 in the vicinity of lubricant collection recess 12. The oleophobic coating causes lubricant which may flow onto the fixed member by capillary movement to bead up and to easily become entrained into the seal gas flow as was described earlier in greater detail with reference to FIGS. 2 and 3.

Preferably the shaft surface opposite the coated fixed housing surface is also coated with the oleophobic coating 19 and this preferred arrangement is shown in FIG. 4. The combination of seal gas flow as it issues from seal 15 into recess 12 and the large centrifugal force created by the high rotational speed of shaft 2 insures that any lubricant drops collecting on shaft 2 are radially discharged into recess 12 for subsequent removal through passageway 13.

Although the seal assembly of this invention has been described in detail with reference to specific preferred embodiments, it can be appreciated that there are many other embodiments of the seal assembly of this invention which are within the scope and spirit of the claims.

I claim:

1. A clearance-type liquid lubricant seal assembly comprising:
   (a) a shaft member;
   (b) a wall member extending axially along and circumferentially around said shaft member, one of said members being fixed and the other member being rotatable relative to said fixed member, said members being closely spaced for at least a portion of their axial length;
   (c) lubricant collection means comprising a recess in said wall member in flow communication with said closely spaced portion positioned between said closely spaced portion and a source of lubricant;
   (d) means for supplying sealing gas to said closely spaced portion such that a sealing gas flow stream is caused to flow from said closely spaced portion toward said source of lubricant; and
   (e) an oleophobic coating on said fixed member in the vicinity of said lubricant collection means,
   whereby liquid lubricant entering the vicinity of said lubricant collection means and flowing on the fixed member is caused to form beads which are entrained in said sealing gas flow stream and thus substantially prevented from entering said closely spaced portion.

2. The seal assembly of claim 1 wherein said shaft member is fixed and said wall member is rotatable.

3. The seal assembly of claim 1 wherein said wall member is fixed and said shaft member is rotatable.

4. The seal assembly of claim 1 wherein said oleophobic coating is also on said rotatable member in the vicinity of said lubricant collection means.

* * * * *

UNITED STATES PATENT AND TRADEMARK OFFICE
CERTIFICATE OF CORRECTION

PATENT NO. : 4,384,725
DATED : May 24, 1983
INVENTOR(S) : N.T. Nenov

It is certified that error appears in the above-identified patent and that said Letters Patent are hereby corrected as shown below:

On the first page, change the date filed to read
-- May 25, 1982 --.

Signed and Sealed this

Twenty-fifth Day of October 1983

[SEAL]

Attest:

GERALD J. MOSSINGHOFF

*Attesting Officer*     *Commissioner of Patents and Trademarks*